US012659666B2

(12) United States Patent
Dreharov

(10) Patent No.: US 12,659,666 B2
(45) Date of Patent: Jun. 16, 2026

(54) AUDIO SYSTEM FOR A MOTOR VEHICLE AND MOTOR VEHICLE WITH SUCH AN AUDIO SYSTEM

(71) Applicant: Dr. Ing. h.c. F. Porsche Aktiengesellschaft, Stuttgart (DE)

(72) Inventor: Nikolay Dreharov, Remseck am Neckar (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 254 days.

(21) Appl. No.: 18/527,643

(22) Filed: Dec. 4, 2023

(65) Prior Publication Data

US 2024/0205604 A1 Jun. 20, 2024

(30) Foreign Application Priority Data

Dec. 15, 2022 (DE) ..................... 10 2022 133 397.3

(51) Int. Cl.

| | |
|---|---|
| ***H04R 1/10*** | (2026.01) |
| ***H04R 3/04*** | (2006.01) |
| ***H04R 5/033*** | (2006.01) |
| ***H04R 5/04*** | (2006.01) |
| *G10K 11/178* | (2006.01) |

(52) U.S. Cl.
CPC ............. *H04R 5/04* (2013.01); *H04R 1/1083* (2013.01); *H04R 3/04* (2013.01); *H04R 5/033* (2013.01); *H04R 2499/13* (2013.01)

(58) Field of Classification Search
CPC ............. H04R 5/04; G10K 2210/3225; G10K 2210/1282; G10K 11/17821
See application file for complete search history.

(56) References Cited

U.S. PATENT DOCUMENTS

| | | | | |
|---|---|---|---|---|
| 11,200,880 | B2 | 12/2021 | Makino et al. | |
| 2011/0150233 | A1 * | 6/2011 | Gautama .......... | G10K 11/17857 381/71.6 |
| 2015/0365771 | A1 * | 12/2015 | Tehrani ................ | H04R 25/554 381/315 |
| 2022/0201421 | A1 * | 6/2022 | McElveen .............. | H04R 1/406 |

FOREIGN PATENT DOCUMENTS

| | | |
|---|---|---|
| DE | 102004039066 A1 | 4/2005 |

* cited by examiner

*Primary Examiner* — James K Mooney
(74) *Attorney, Agent, or Firm* — LEYDIG, VOIT & MAYER, LTD.

(57) ABSTRACT

An audio system (1) for a motor vehicle has an individual playback device (5) configured to individually expose a vehicle occupant to sound. The individual playback device (5) is configured to play back an individual compensation signal for individually suppressing the audio signal played back by a general playback device, for the vehicle occupant who uses the individual playback device (5).

16 Claims, 1 Drawing Sheet

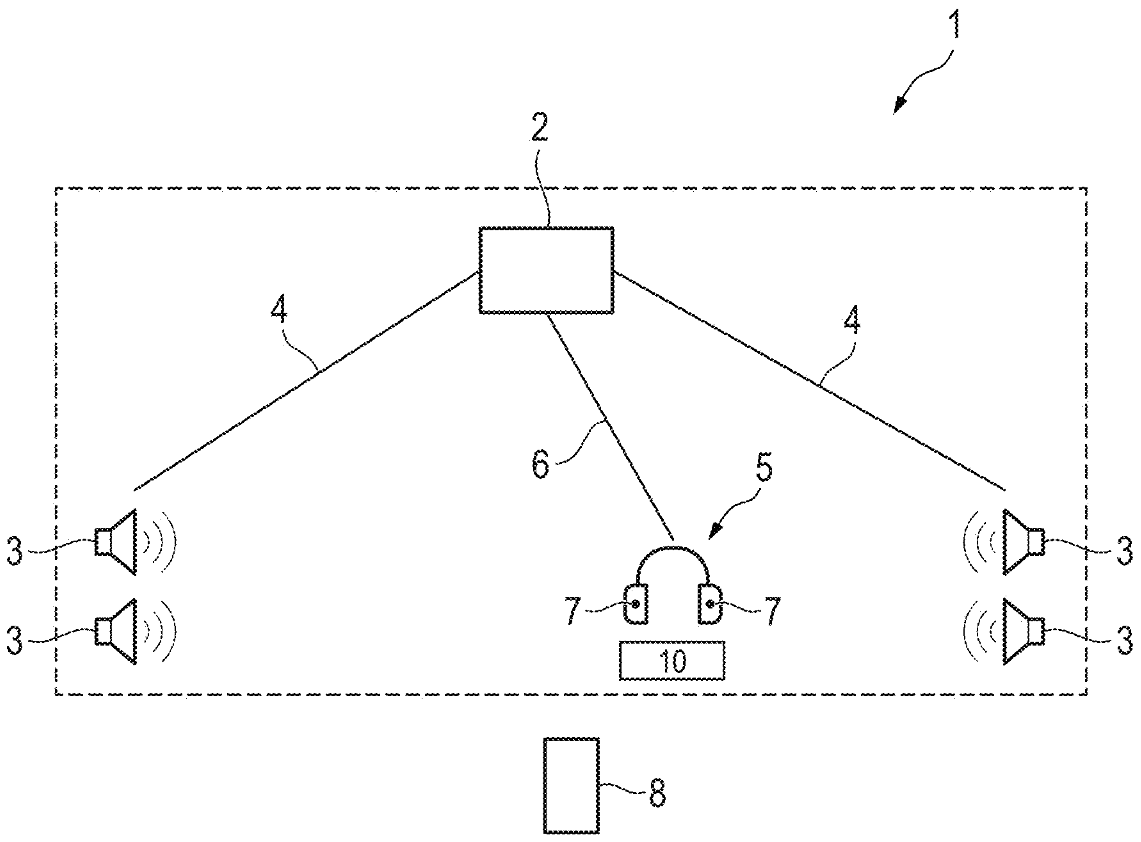
1
2
4
4
6
5
3
3
3
3
7
7
10
8

AUDIO SYSTEM FOR A MOTOR VEHICLE AND MOTOR VEHICLE WITH SUCH AN AUDIO SYSTEM

CROSS REFERENCE TO RELATED APPLICATION

This application claims priority on German Patent Application No 10 2022 133 397.3 filed Dec. 15, 2022, the entire disclosure of which is incorporated herein by reference.

BACKGROUND

Field of the Invention

The invention relates to an audio system for a motor vehicle and to a motor vehicle with such an audio system.

Related Art

The prior art includes playback devices, such as headphones, that use a destructive interference to suppress ambient noises for a user. These devices use principles referred to by many designations, including active noise reduction [ANR], active noise cancellation [ANC], active noise canceling, or active sound canceling. Such systems use microphones and speakers to suppress background and ambient noises.

U.S. Pat. No. 11,200,880 discloses a noise canceling system in the form of headphones. Conventional noise canceling headphones generally are particularly effective for suppressing sound waves in the low frequency range and for recurrent, rather monotonic noises, such as engine noises, rolling noises or wind noises. On the other hand, current noise canceling systems or noise canceling headphones are less suited for suppressing music or human language. In this respect, there is a need to improve active noise suppression in an environment where human language and/or music is expected. Such an environment can be found, for example, in a vehicle in which a vehicle interior is filled with an audio signal via a general playback device, such an interior speaker of the motor vehicle that may be used to entertain and/or inform the vehicle operator by playing back a corresponding audio signal. This audio signal may be music, news, warning messages, or similar audio signals or audio content. Some vehicle occupants may not be interested in such audio content but rather perceive them as disruptive. This can be the case if such a vehicle occupant desires to consume an individual audio content and/or audio-visual content different from the audio signal played back via the vehicle interior playback device, such as an audio content played back by a smartphone or other individual device of the vehicle occupant. Even if the corresponding vehicle occupant consumes their individual audio signal by means of headphones with a noise canceling system, the problem exists that the noise canceling system integrated in the headphones cannot sufficiently suppress the audio signal played back by the vehicle interior playback device, since the audio signal that is output via the vehicle interior playback device has frequencies that are in a frequency range in which the noise canceling system does not achieve satisfactory suppression. In addition, the general audio signal that is output may be too complex in terms of its frequency spectrum to analyze this audio signal sufficiently quickly by the noise canceling system and to output a corresponding compensation signal for suppression.

DE 10 2004 039 066 A1 discloses a motor vehicle with an audio system that outputs a compensation signal for an individual vehicle occupant to suppress a general signal to cancel noise. However, there is a need to improve such audio systems.

An object of this invention is to provide an audio system for a motor vehicle in which a particularly precise filtering or suppression or a particularly precise noise canceling of the audio playback of a playback device filling the passenger compartment with sound is achieved by an individual playback device of a vehicle occupant.

SUMMARY

An audio system according to one aspect of the invention comprises a general signal source, a general playback device and an individual playback device. The general signal source transmits an audio signal via a first communication link to the general playback device. The general playback device plays back the received audio signal and fills an interior of the motor vehicle with sound. The individual playback device individually exposes a vehicle occupant to sound and plays back for the vehicle occupant who uses the individual playback device an individual compensation signal for individually suppressing the audio signal played back by the general playback device. The individual playback device is connected via a second communication link to the general signal source, and the general signal source transmits the audio signal and/or a pre-processed signal based on the audio signal, via the second communication link to the individual playback device. The individual playback device comprises one or more microphones and a signal processing device. The signal processing device is configured to generate the individual compensation signal using the signal transmitted from the general signal source to the individual playback device, as a function of a microphone signal of the one or more microphones.

According to the invention, the headphones, headset or other individual playback device directly receives the audio signal and/or a pre-processed signal based on the audio signal, via the second communication link. Thus, in contrast to a conventional noise canceling system, the signal is directly present in a form, such as an electronic form, so that it is unnecessary to first receive the audio signal that is played back acoustically and then to convert the audio signal into an electronic signal for processing in the signal processing device to generate the compensation signal. As a result, much more precise noise canceling is possible since much faster processing and generation of the compensation signal can take place than would be the case if the acoustic audio signal had to be converted first, as is the case with conventional systems. Pre-processing of the audio signal in the signal processing device can virtually take place before the audio signal reaches the vehicle occupant in acoustic form, i.e., through the playback by the general playback device. Only minor adjustments to the compensation signal are then necessary for efficiently suppressing the general audio signal played back by the general playback device for the vehicle occupant who uses the individual playback device.

The audio signal is transmitted in non-acoustic form directly to the individual playback device and thus does not first have to be converted into an electronic signal or digital signal first. Thus, this audio signal can be processed or analyzed more quickly and can be used in the generation of the compensation signal. For this purpose, the signal processing device can comprise a pre-processing unit that is configured to pre-process the signal received via the second communication link, e.g., to perform a frequency analysis, a Fourier transform, or the like. A final processing unit then generates the compensation signal based on the microphone signal of the one or more microphones and using the signal pre-processed by the pre-processing unit. As a result, calculation operations necessary for generation of the compensation signal can be transferred at least in part from the final processing unit to the pre-processing unit and, as a result, can be performed in advance, i.e., in advance of the receipt of the audio signal in acoustic form. The pre-processing unit need not be an assembly physically separate from the final processing unit. Rather, the pre-processing unit and the final processing unit can be formed by corresponding software products or computer programs executed by the signal processing device.

The audio signal may be transmitted in digital form to the individual playback device and may be transmitted in analog form to the general playback device.

The second communication link of some embodiments is a wireless communication link, such as a Bluetooth link. The first and second communication links may be different. In particular, the first communication link may be wired and the second communication link may be wireless.

The general signal source may be an infotainment system of the vehicle or a part of an infotainment system of the vehicle. Such an infotainment system can comprise functional units or functional components that transmit an audio signal to the general playback device. Such functional units can, for example, be a radio, a navigation device, a CD player and similar components. The infotainment system can also comprise an interface for coupling external devices.

The general signal source of some embodiments is couplable to an external device to receive the audio signal that is to be transmitted to the general playback device. For example, the external device can be a smartphone, a cell phone, a tablet computer, or the like. The coupling between the external device and the general signal source can be wired, for example via a USB cable. However, the coupling is preferably wireless, for example via Wi-Fi or Bluetooth. Wireless coupling between a smartphone or tablet with an infotainment system of a vehicle is often referred to as wireless carplay if the smartphone or tablet can be operated via control elements of the infotainment system.

The pre-processed signal can comprise an analysis of the frequency spectrum and/or include a general compensation signal and/or include metadata.

The signal processing device may comprise an audio processor.

The audio system of some embodiments is configured to delay the playback of the audio signal by the general playback device in comparison to the transmission of the audio signal and/or of the pre-processed signal to the individual playback device. The delay gives the individual playback device sufficient time to receive and analyze the audio signal or the pre-processed signal before the audio signal in acoustic form reaches the individual playback device The audio system may be configured to delay the transmission of the audio signal to the general playback device in comparison to the transmission of the audio signal and/or of the pre-processed signal to the individual playback device. The delay may be between a millisecond and a second.

The individual playback device of some embodiments is configured to establish a further communication link with an individual signal source for the purpose of receiving and playing back an individual audio signal transmitted by the individual signal source. The individual signal source can be a smartphone, tablet or a further signal source integrated in the vehicle, such as a multimedia system different from the general signal source.

The audio signal can be perceived slightly differently at different locations in the passenger compartment due to the design of the passenger compartment, the position of the individual playback device, objects and other persons where the audio signal played back by the general playback device is reflected and attenuated. To achieve particularly precise noise canceling, the signal processing device may comprise a pre-processing unit for pre-processing the signal received via the second communication link. An algorithm may be used in the pre-processing and takes into account not the actual general audio signal, the pre-processed signal, and how the acoustically perceptible audio signal is expected to vary in the area of the individual playback device. This variation or a corresponding variation function may be ascertained by a self-learning algorithm. This can, for example, take place by comparing the general audio signal to the audio signal received in acoustic form by the microphone or the plurality of microphones of the individual playback device. A comparison between the actual, undistorted audio signal and the acoustic audio signal actually arriving in the area of the individual playback device takes place to ascertain the deviation and to compensate for it by an adjustment of the algorithm.

The compensation signal may be generated by a self-learning algorithm.

The signal processing device of some embodiments determines a general compensation signal based on the signal transmitted from the general signal source to the individual playback device. This general compensation signal may be adjusted as a function of the microphone signal of the one or more microphones to generate the individual compensation signal.

The individual playback device of some embodiments comprises headphones. The term "headphones" is to be interpreted broadly to include so-called earphones. The individual playback device with headphones can be a headset, e.g., an augmented reality (AR) headset or a virtual reality (VR) headset. The individual playback device can also be in the form of glasses with integrated speakers or earphones, for example as AR glasses or VR glasses.

The individual playback device may be an integral part of the audio system or of the vehicle. Thus, communication between the general signal source and the individual playback device can be particularly efficient so that signal transmission via the second communication link can take place particularly quickly, which in turn advantageously affects precise noise canceling of the general audio signal.

The audio system may comprise plural individual playback devices.

The vehicle according to the invention comprises the above-described audio system. The above-described advantageous embodiments of the audio system can also be provided in the vehicle according to the invention.

The invention is explained in more detail below with reference to an exemplary embodiment, without being limited thereto.

BRIEF DESCRIPTION OF THE DRAWING

FIG. 1 is a schematic representation of an audio system.

DETAILED DESCRIPTION

FIG. 1 is a schematic representation of an audio system 1 for a motor vehicle. The audio system 1 comprises a general signal source 2 that may be an infotainment system. The audio system 1 further comprises a general playback device with speakers 3 that are arranged in a vehicle interior and are configured to fill the vehicle interior of the motor vehicle with sound. The speakers 3 are connected via a first communication link 4 to the general signal source 2. The general signal source 2 is configured to generate an audio signal and to transmit the audio signal via the first communication link 4 to the speakers 3. The speakers 3 are configured to play back the received audio signal. In this respect, the first communication link 4 can be a traditional wired connection.

The audio system 1 also comprises an individual playback device 5, which in the present case is designed as headphones. The individual playback device 5 is configured for individually exposing a vehicle occupant to sound. The individual playback device 5 is configured to play back an individual compensation signal for the individual suppression of the audio signal played back by the general playback device, in this respect by the speakers 3 for the vehicle occupant who uses the individual playback device 5. Ideally, a user of the individual playback device 5 therefore does not perceive the audio signal played back by the speakers 3. For precise suppression of the audio signal, the individual playback device 5 is connected via a second communication link 6 to the general signal source 2. The general signal source 2 is configured to transmit the audio signal via the second communication link 6 to the individual playback device 5. The individual playback device 5 also comprises one or more microphones 7.

For the purpose of generating the individual compensation signal, the individual playback device 5 comprises a signal processing device 10 that is configured to generate the individual compensation signal as a function of a microphone signal of the one or more microphones 7, using the signal transmitted from the general signal source 2 to the individual playback device 5. The signal processing device 10 may comprise an audio processor. Additionally, the signal processing device 10 can comprise a pre-processing unit that is configured to pre-process the signal received via the second communication link, e.g., to perform a frequency analysis, a Fourier transform, or the like. A final processing unit then generates the compensation signal based on the microphone signal of the one or more microphones and using the signal pre-processed by the pre-processing unit. As a result, calculation operations necessary for generation of the compensation signal can be transferred at least in part from the final processing unit to the pre-processing unit and, as a result, can be performed in advance, i.e., in advance of the receipt of the audio signal in acoustic form. The pre-processing unit need not be an assembly physically separate from the final processing unit. Rather, the pre-processing unit and the final processing unit can be formed by corresponding software products or computer programs executed by the signal processing device 10.

The audio signal is transmitted directly to the individual playback device 5 via the second communication link 6. Thus, the audio signal can already be processed in the signal processing device 10 before the audio signal in acoustic form reaches the individual playback device 5 via the speaker 3. As a result, the signal processing device 10 can already calculate a basic or approximate compensation signal and this basic compensation signal then merely needs to be adjusted slightly and as a function of the acoustic audio signal actually received by the microphones 7 of the individual playback device 5 to achieve particularly precise suppression of the audio signal played back by the general playback device. In addition, other ambient noises, such as engine noises or wind noises, can also be suppressed, as is the case with the noise canceling systems described above.

In addition to the playback of the compensation signal, the individual playback device 5 can also play back an individual audio signal. Such an individual audio signal can, for example, be transmitted by an individual signal source 8 to the individual playback device 5 and played back by the individual playback device 5. For example, the individual signal source 8 may be a smartphone of the vehicle occupant.

In connection with the transmission of the general audio signal to the general playback device and to the individual playback device 5, it is considered particularly advantageous if the transmission of the audio signal to the general playback device is delayed in comparison to the transmission of the audio signal to the individual playback device 5. The time delay is preferably between a millisecond and a second. As a result, the signal processing device 10 is given sufficient time to analyze the expected general audio signal and to calculate a pre-processed compensation signal that is then already present when the general audio signal played back by the general playback device reaches the individual playback device 5.

LIST OF REFERENCE SIGNS

1 Audio system
2 General signal source
3 Speakers
4 First communication link
5 Individual playback device
6 Second communication link
7 Microphone
8 Individual signal source

The invention claimed is:

1. An audio system for a motor vehicle, the audio system comprising:

a general signal source that is configured to transmit an audio signal;

a general playback device that is configured to fill a vehicle interior of the motor vehicle with sound, the general playback device being connected via a first communication link to the general signal source, the general signal source being configured to transmit the audio signal via the first communication link to the general playback device, the general playback device being further configured to play back the received audio signal; and an individual playback device that is configured to individually expose a vehicle occupant to sound, the individual playback device being further configured to play back, for the vehicle occupant who uses the individual playback device, an individual compensation signal for individually suppressing the audio signal played back by the general playback device, the individual playback device being connected via a second communication link to the general signal source, wherein the general signal source is further configured to transmit the audio signal and/or a pre-processed signal based on the audio signal, via the second communication link to the individual playback device, wherein the individual playback device comprises one or more microphones, and a signal processing device, wherein the signal processing device is configured to generate the individual compensation signal using the signal transmitted from the general signal source to the individual playback device, as a function of a microphone signal of the one or more microphones, and wherein the signal processing device comprises a pre-processing unit for pre-processing the audio signal and/or the pre-processed signal received via the second communication link, wherein the pre-processing unit is configured to use an algorithm to account for an expected variation of an acoustic audio signal in an area of the individual playback device by:

comparing an actual, undistorted audio signal and an acoustic audio signal arriving in the area of the individual playback device to ascertain a deviation therebetween, and compensating for the deviation by adjusting the algorithm of the pre-processing unit.

2. The audio system of claim 1, wherein the audio system is configured to delay the playback of the audio signal by the general playback device in comparison to the transmission of at least one of the audio signal and the pre-processed signal to the individual playback device.

3. The audio system of claim 2, wherein the delay is between 1 millisecond and 1 second.

4. The audio system of claim 1, wherein the audio system is configured to delay the transmission of the audio signal to the general playback device in comparison to the transmission of at least one of the audio signal and the pre-processed signal to the individual playback device.

5. The audio system of claim 4, wherein the delay is between 1 millisecond and 1 second.

6. The audio system of claim 1, wherein the individual playback device is further configured to establish a further communication link with an individual signal source for the purpose of receiving and playing back an individual audio signal transmitted by the individual signal source.

7. The audio system of claim 6, wherein the individual playback device is a smartphone or a tablet that does not include the general signal source.

8. The audio system of claim 6, wherein the individual playback device is a multimedia system of the vehicle that is different from the general signal source.

9. The audio system of claim 1, wherein the signal processing device is further configured to determine a general compensation signal based on the signal transmitted from the general signal source to the individual playback device and to individually adjust this general compensation signal as a function of the microphone signal of the one or more microphones for generating the individual compensation signal.

10. The audio system of claim 1, wherein the individual playback device comprises headphones.

11. The audio system of claim 1, wherein the audio system comprises a plurality of individual playback devices.

12. A vehicle comprising the audio system of claim 1.

13. The audio system of claim 1, wherein the algorithm is a first self-learning algorithm.

14. The audio system of claim 13, wherein the compensation signal is generated by a second self-learning algorithm.

15. The audio system of claim 1 wherein the general signal source is configured to transmit the audio signal and the pre-processed signal based on the audio signal, via the second communication link, to the individual playback device.

16. An audio system for a motor vehicle, comprising:

a general signal source configured to transmit an audio signal;

a general playback device that is configured to fill a vehicle interior of the motor vehicle with sound, the general playback device being connected via a first communication link to the general signal source, the general signal source being configured to transmit the audio signal via the first communication link to the general playback device, the general playback device being configured to play back the received audio signal; and a plurality of individual playback devices each configured to individually expose a respective vehicle occupant to sound, each individual playback device being configured to play back, for the respective vehicle occupant using the respective individual playback device, an individual compensation signal for individually suppressing the audio signal played back by the general playback device, each individual playback device being connected via a second communication link to the general signal source, the general signal source being configured to transmit the audio signal and/or a pre-processed signal based on the audio signal, via the second communication links, to the individual playback devices, the individual playback devices each comprising one or more microphones and a signal processing device configured to generate the respective individual compensation signal, wherein each respective signal processing device is configured to generate the respective individual compensation signal using the audio signal and/or the pre-processed signal based on the audio signal transmitted from the general signal source to the respective individual playback device as a function of a microphone signal of the one or more microphones of the respective individual playback device, wherein each signal processing device comprises a pre-processing unit for pre-processing the audio signal and/or the pre-processed signal received via the second communication link, wherein the pre-processing unit is configured to use an algorithm to account for a respective expected variation of an acoustic audio signal in a respective area of the respective individual playback device by:

comparing an actual, undistorted audio signal and an acoustic audio signal arriving in the respective area of the respective individual playback device to ascertain a deviation therebetween, and compensating for the deviation by adjusting the algorithm of the respective pre-processing unit.

* * * * *